(No Model.)

A. J. ERWIN.
SEWER TRAP.

No. 252,869. Patented Jan. 31, 1882.

WITNESSES
Arthur J. Erwin INVENTOR
By Liggett & Liggett
ATTORNEYS

N. PETERS. Photo-Lithographer. Washington, D. C.

UNITED STATES PATENT OFFICE.

ARTHUR J. ERWIN, OF CLEVELAND, OHIO.

SEWER-TRAP.

SPECIFICATION forming part of Letters Patent No. 252,869, dated January 31, 1882.

Application filed May 26, 1881. (No model.)

*To all whom it may concern:*

Be it known that I, ARTHUR J. ERWIN, of Cleveland, in the county of Cuyahoga and State of Ohio, have invented certain new and useful Improvements in Sewer-Traps; and I do hereby declare the following to be a full, clear, and exact description of the invention, such as will enable others skilled in the art to which it pertains to make and use it, reference being had to the accompanying drawings, which form part of this specification.

My invention relates to sewer traps; and it consists substantially in the arrangement of the devices hereinafter specified.

It is the object of my invention to prevent the introduction or escape of sewer-gases into dwellings or apartments, and at the same time to provide a trap of economical construction which may be readily connected w th waste-pipes.

Figure 1:
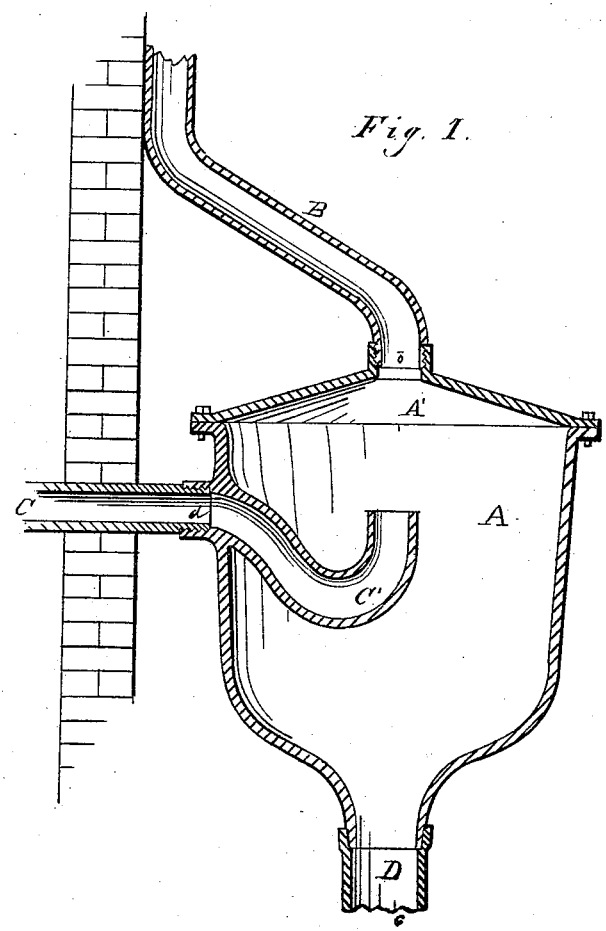
Figure 2:
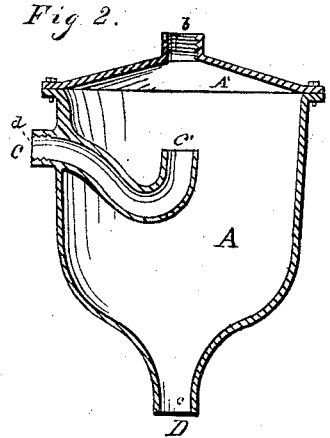

In the drawings, Figure 1 represents my device in longitudinal vertical section. Fig. 2 represents my device in longitudinal section within the pipe-connections.

A is a terminus or inlet to the sewer, which may be enlarged, substantially as shown, and be provided with a detachable cap, A'.

Extending from the upper portion of the chamber A is a vent pipe or conduit, B, which may be extended to a sufficient distance upward, or may connect with the chimney-flue in such a manner as to discharge the gases at any place desired.

C is a waste-pipe, which enters and terminates within the chamber A. Its terminal portion is trapped by being bent into a goose-neck.

D is a vent or discharge of the chamber A, and it is a pipe connecting directly with the sewer or with another waste-pipe.

The operation of my device is as follows: The parts are assembled substantially in the manner shown in the drawings, all joints being made gas-tight. The water escaping through the waste-pipe C forms a seal in the goose-neck or trap C', thus preventing the entrance of gas into the waste-pipe beyond said water-seal. As the water escapes from the pipe C it enters the chamber A, and is discharged through the pipe D into the sewer. The action of the pipe B is to conduct gases which would otherwise escape or enter the pipe C. As already stated, the pipe B can be led to any place where it is desired to discharge the sewer-gas. By means of the vent B all liability to siphon the trap C' is avoided, and the result is a device which will prevent the entrance of sewer-gas into the house or apartment with which it is connected.

It will be apparent that all the waste-pipes of a dwelling may unite in a common outlet terminating, as described, in a single chamber, A, and thus a single device may serve to protect the entire dwelling.

I am aware that it is not new to provide a sewer-trap with a conduit for the escape of gas; also, I am aware that a stench trap has been constructed with the inlet provided with a trap and a discharge-conduit attached to the lower portion of the chamber, and hence I make no claim to such features of construction and arrangement of parts. In my improvement a chamber into which the waste water enters has three conduits communicating therewith—viz., one at its upper end for the escape of gas, one at its lower end for the escape of waste, and one located between the upper and lower end of the chamber which is provided with a trap to allow of a free escape of the waste water into the chamber, and yet seat the eductive end of said pipe to prevent the back-flow of gas.

What I claim is—

A sewer-trap consisting of the chamber A, provided with the trap C', having an inlet at the side of the chamber, an outlet at the bottom of the chamber, and short pipe-sections at the side and bottom to connect with the inlet and discharge pipes, the several parts being cast in a single piece, in combination with the cover A', provided with a gas-outlet, *b*, substantially as set forth.

In testimony whereof I have signed my name to this specification in the presence of two subscribing witnesses.

ARTHUR J. ERWIN.

Witnesses:
 JNO. CROWELL, Jr.,
 ALBERT E. LYNCH.